(12) United States Patent
Ortiz et al.

(10) Patent No.: US 10,688,884 B2
(45) Date of Patent: Jun. 23, 2020

(54) HOUSING INCLUDING SNAG-FIT CONNECTION BETWEEN HOUSING COMPONENTS

(71) Applicants: Robert Bosch Mexico Sistemas Automotrices S.A. de C.V., Toluca (MX); Robert Bosch GmbH, Stuttgart (DE)

(72) Inventors: Luis Angel Ramirez Ortiz, Toluca (MX); Pablo Daniel Molina Cardozo, Toluca (MX); Alex Martin, Karlsruhe (DE)

(73) Assignees: Robert Bosch Mexico Sistemas Automotrices S.A. DE C.V., Toluca (MX); Robert Bosch GmbH, Stuttgart (DE)

( * ) Notice: Subject to any disclaimer, the term of this patent is extended or adjusted under 35 U.S.C. 154(b) by 1 day.

(21) Appl. No.: 16/103,223

(22) Filed: Aug. 14, 2018

(65) Prior Publication Data
US 2020/0055424 A1 Feb. 20, 2020

(51) Int. Cl.
*B60N 2/22* (2006.01)
*B60N 2/02* (2006.01)

(52) U.S. Cl.
CPC ...... *B60N 2/0232* (2013.01); *B60N 2002/024* (2013.01)

(58) Field of Classification Search
CPC ........ F16B 21/06; F16B 21/07; F16B 21/071; F16B 21/073; F16B 21/08; F16B 21/082; F16B 21/084; F16B 21/086; F16B 21/088; F16H 57/031; F16H 57/02; F16H 2057/02034; B60N 2/032; B60N 2002/024
See application file for complete search history.

(56) References Cited

U.S. PATENT DOCUMENTS

| 3,727,271 | A | 4/1973 | Znamirowski |
| 5,352,047 | A | 10/1994 | Ingall et al. |
| 5,450,190 | A | 9/1995 | Schwartz et al. |
| 6,435,017 | B1 | 8/2002 | Nowicki, Jr. et al. |
| 9,969,303 | B2 * | 5/2018 | Ta .................. B60N 2/0232 |
| 2004/0164634 | A1 * | 8/2004 | Oh .................. F16H 57/039 310/98 |
| 2007/0258795 | A1 * | 11/2007 | Nakazato ............ F16B 5/065 411/508 |

* cited by examiner

*Primary Examiner* — Richard W Ridley
*Assistant Examiner* — Brian J McGovern
(74) *Attorney, Agent, or Firm* — Kelly McGlashen; Maginot, Moore & Beck LLP

(57) ABSTRACT

A vehicle seat actuator includes an electric motor and a gear set that connects the drive motor to the seat and transmits the output of the motor to the vehicle seat. The drive motor and gear set are each disposed in an individual, dedicated housing component. The individual housing components are then assembled together to provide the actuator. The housing components are maintained in the assembled configuration using snap fit mechanical fasteners. Each snap-fit fastener includes a receiving portion provided on one housing component and a retaining portion provided on the other housing component. The receiving portion may be a through hole formed in the drive motor housing, while the retaining component protrudes from an outer surface of the gear housing and forms a snap-fit engagement with the receiving portion.

13 Claims, 5 Drawing Sheets

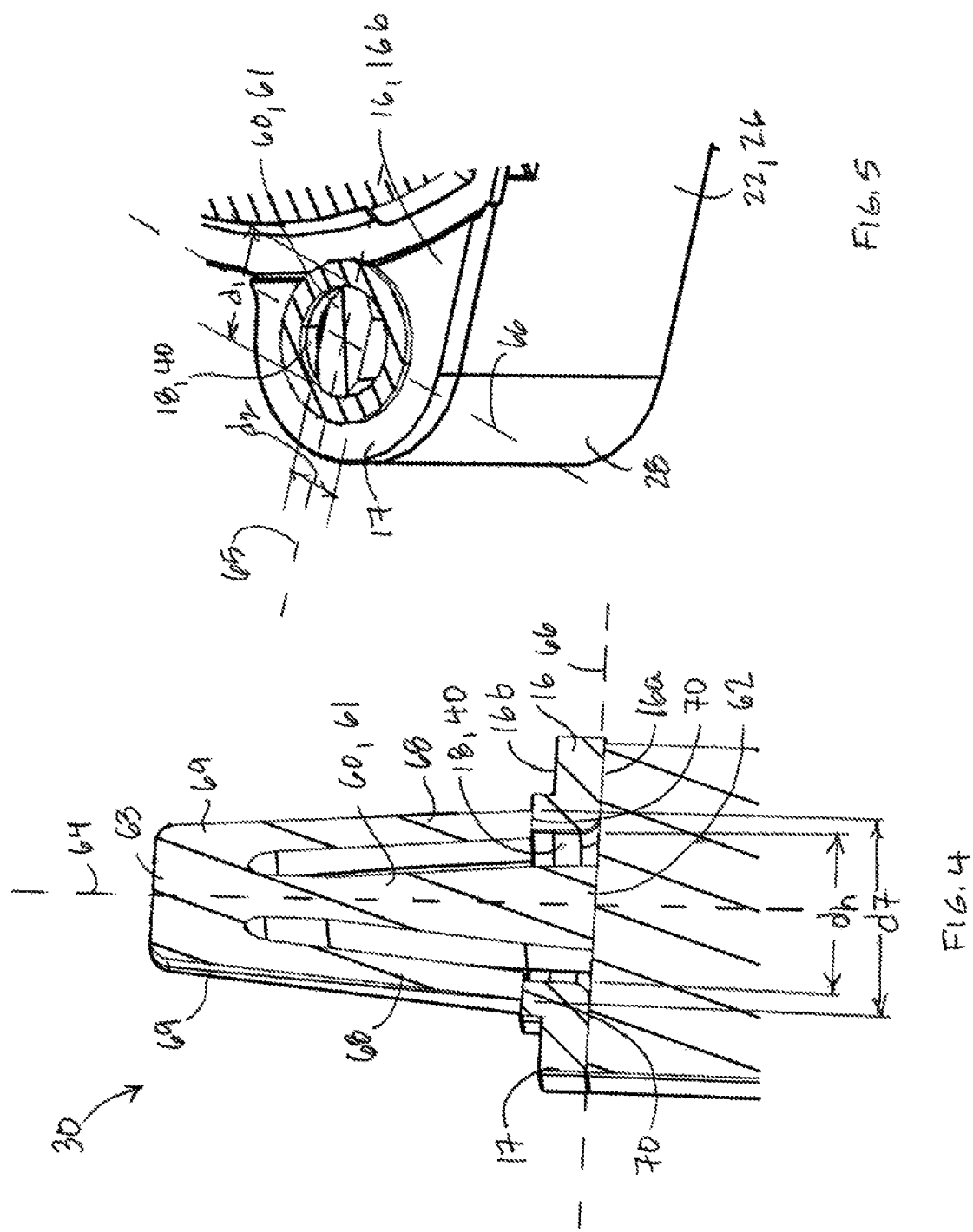

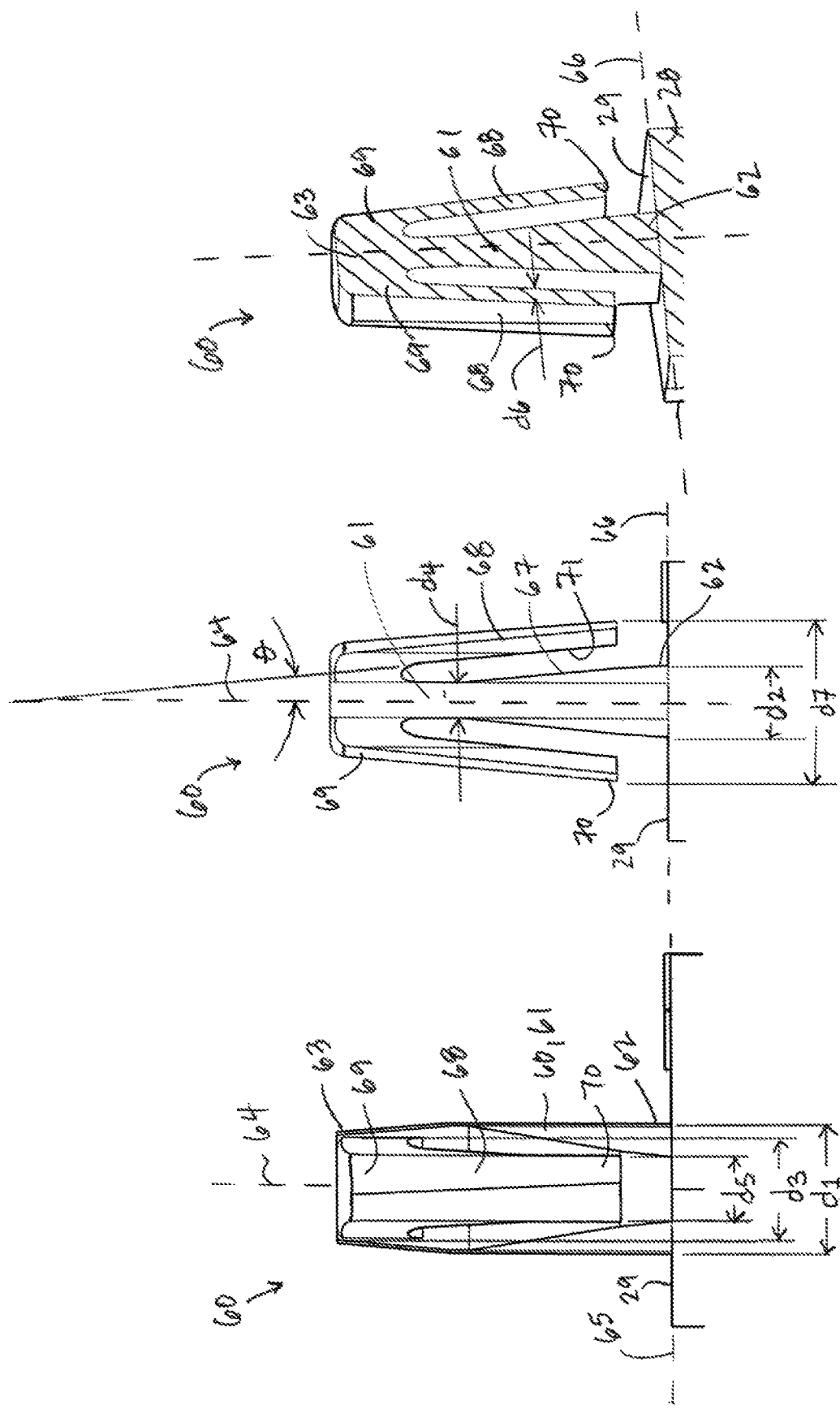

HOUSING INCLUDING SNAG-FIT CONNECTION BETWEEN HOUSING COMPONENTS

BACKGROUND

Actuators such as those used to adjust seat position within a vehicle may include an electric motor and a gear set. The gear set connects the drive motor to the vehicle seat, and transmits the output of the motor to the vehicle seat. The drive motor and gear set may be fabricated separately and disposed in individual housing components. The individual housing components are then assembled together to provide the actuator. The housing components are maintained in the assembled configuration using mechanical fasteners such as screws. However, using screws to secure housing elements together may increase the number of parts that form the assembly and increase manufacturing steps and complexity. Increased number of parts and manufacturing complexity results in an increased actuator cost.

A need exists for an actuator housing that has fasteners that securely join the housing components, while reducing the number of parts that form the actuator assembly and reducing manufacturing complexity.

SUMMARY

In some aspects, an actuator housing includes a gear housing and a drive motor housing that is secured to the gear housing via a fastener. One of the drive motor housing and the gear housing includes a sidewall and a flange. The flange protrudes from the sidewall in a direction that is perpendicular to the sidewall, and includes a through hole that extends between a flange first side and a flange second side. The fastener includes a receiving portion that includes the through hole; and a retaining portion that protrudes from an outer surface of the other of the drive motor housing and the gear housing. The retaining portion forms a snap-fit engagement with the receiving portion, the retaining portion comprising a post and a beam. The post includes a post first end that is fixed to the outer surface, and a post second end that is opposed to the post first end in which a longitudinal axis of the post extends through the post first end and the post second end. The beam includes a beam fixed end that extends from the post second end; and a beam free end that is spaced apart from the beam fixed end. The beam is cantilevered from the post second end so as to overlie the post and extend at an acute angle relative to the longitudinal axis. The beam free end is spaced apart from the longitudinal axis by a distance that is greater than a radius of the through hole. In addition, the post is configured to extend through the through hole such that the outer surface of the gear housing abuts the flange first side, the post protrudes outward relative to the flange second side, and the beam free end faces the flange second side.

In some aspects, a fastener is configured to join a first housing portion to a second housing portion. The first housing portion includes a sidewall; and a flange that protrudes from the sidewall in a direction that is perpendicular to the sidewall. The flange includes a through hole that extends between a flange first side and a flange second side. The fastener includes a receiving portion that includes the through hole; and a retaining portion that protrudes from an outer surface of the second housing portion and forms a snap-fit engagement with the receiving portion. The retaining portion includes a post and a beam. The post includes a post first end that is fixed to the outer surface of the second housing portion and a post second end that is opposed to the post first end in which a longitudinal axis of the post extends through the post first end and the post second end. The beam includes a beam fixed end that extends from the post second end; and a beam free end that is spaced apart from the beam fixed end. The beam is cantilevered from the post second end so as to overlie the post and extend at an acute angle relative to the longitudinal axis. The beam free end is spaced apart from the longitudinal axis a distance that is greater than a radius of the through hole. In addition, the post is configured to extend through the through hole such that the outer surface of the second housing portion abuts the flange first side, the post protrudes outward relative to the flange second side, and the beam free end faces the flange second side.

In some embodiments, the first end of the post has a first dimension along a first transverse axis that is perpendicular to the longitudinal axis, and the second end of the post has a second dimension along the first transverse axis, and the second dimension is less than the first dimension.

In some embodiments, the first end of the post has a third dimension along a second transverse axis that is perpendicular to the longitudinal axis and to the first transverse axis, and the third dimension is less than the first dimension.

In some embodiments, the post has a minimum dimension along the second transverse axis at a location that is spaced apart from the first end of the post.

In some embodiments, the post has a minimum dimension along the first transverse axis at the post second end.

In some embodiments, the first dimension corresponds to a diameter of the through hole.

In some embodiments, the first end of the post has a first dimension along a first transverse axis that is transverse to the longitudinal axis, and a second dimension along a second transverse axis that is transverse to the longitudinal axis and the first transverse axis, where the second dimension is less than the first dimension.

In some embodiments, a portion of a surface of the post that faces the beam is angled relative to the longitudinal axis such that the portion of the surface of the post is parallel to a surface of the beam that faces the post.

In some embodiments, the beam is a first beam, and the fastener comprises a second beam disposed on a side of the post that is opposed to the first beam.

In some embodiments, the first beam and the second beam reside in a plane that includes the second transverse axis and the longitudinal axis.

In some embodiments, the beam free end is parallel to the second side of the flange.

In some aspects, an actuator such as those used to adjust seat position within a vehicle includes an electric motor and a gear set that connects the drive motor to the vehicle seat and transmits the output of the motor to the vehicle seat. The drive motor and gear set are each disposed in an individual, dedicated housing component. The individual housing components are then assembled together to provide the actuator. The housing components are maintained in the assembled configuration using snap fit mechanical fasteners. Use of snap-fit mechanical fasteners can be advantageous since the snap fit fastener components may be formed integrally with the corresponding housing components in an injection molding process. In addition, fewer parts are included in the assembly and housing assembly is simple and can be performed without tools.

In some aspects, the snap-fit fastener includes a receiving portion provided on one housing component (for example, the drive motor housing) and a retaining portion provided on the other housing component (for example, the gear housing). The receiving portion may be a through hole formed in the drive motor housing, while the retaining component protrudes from an outer surface of the gear housing. In use, the retaining portion is inserted into the receiving portion, engages the receiving portion and forms a snap-fit engagement with the receiving portion. Advantageously, since the receiving portion comprises a through hole, the screw holes previously provided in the drive motor housing can be repurposed to form a portion of the snap-fit fastener. As a result, minimal or no redesign of the drive motor housing is required to implement the snap-fit fastener as a securing mechanism.

In some aspects, the retaining portion of the snap-fit fastener includes a post that protrudes from an outer surface of the gear housing, and a beam that is cantilevered from a free end of the post so as to overlie the post and extend at an acute angle relative to a longitudinal axis of the post. The retaining portion, which protrudes from an outer surface of the gear housing and thus is somewhat exposed, includes structural features that enhance stability and durability of the retaining portion and reduce likelihood of damage during assembly and handling of the actuator. The structural features include providing additional material at a location that experiences a large bending moment upon impact to the post, for example at the base of the post. In addition, the base of the post has a diameter that corresponds to a diameter of the through hole, whereby the post is stably received in the through hole.

BRIEF DESCRIPTION OF THE DRAWINGS

FIG. 4 is side cross-sectional view of the snap-fit fastener as seen along line 4-4 of FIG. 1.

FIG. 5 is top cross-sectional view of the snap-fit fastener as seen along line 5-5 of FIG. 1.

FIG. 9 is a side plan view of a retaining portion of the snap-fit fastener as seen in a direction along a second transverse axis.

FIG. 10 is a side plan view of a retaining portion of the snap-fit fastener as seen in a direction along a first transverse axis.

FIG. 11 is a cross-sectional view of a retaining portion of the snap-fit fastener as seen along line 11-11 of FIG. 7.

DETAILED DESCRIPTION

Figure 1:
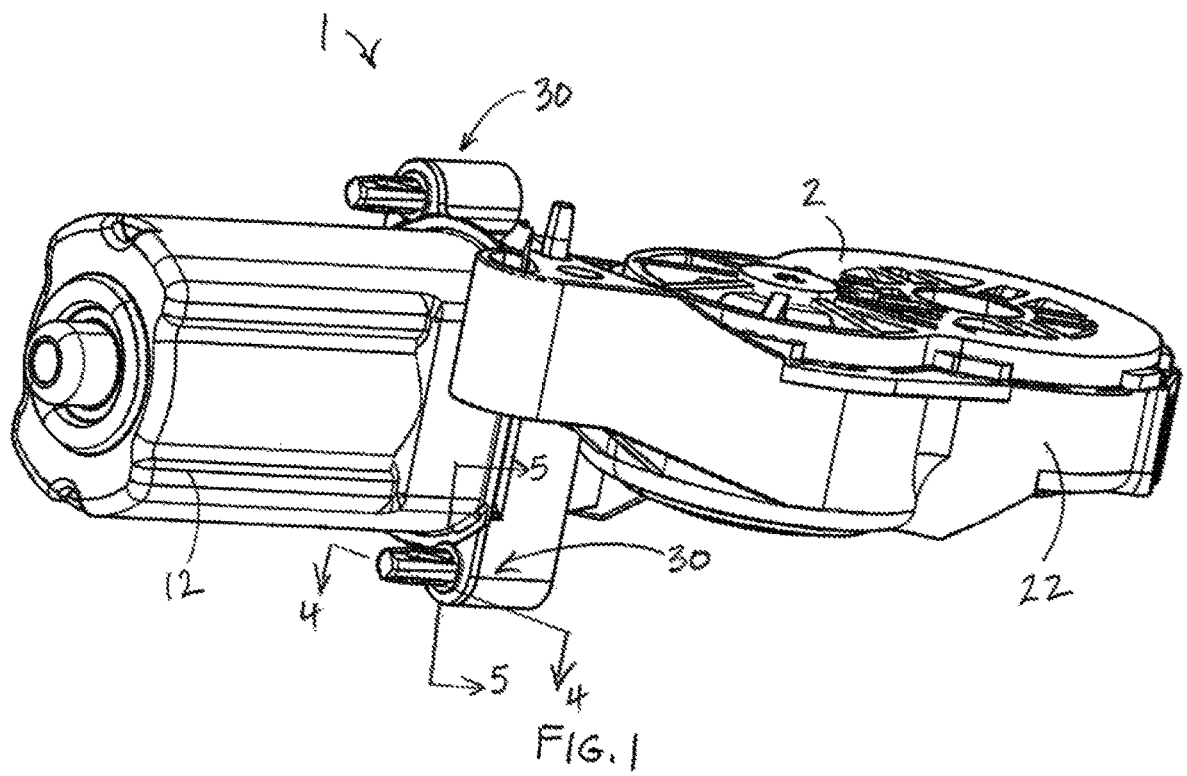
FIG. 1 is a side perspective view of an actuator having an actuator housing that includes a gear housing and a drive motor housing that are connected via a snap-fit fastener.
Figure 2:
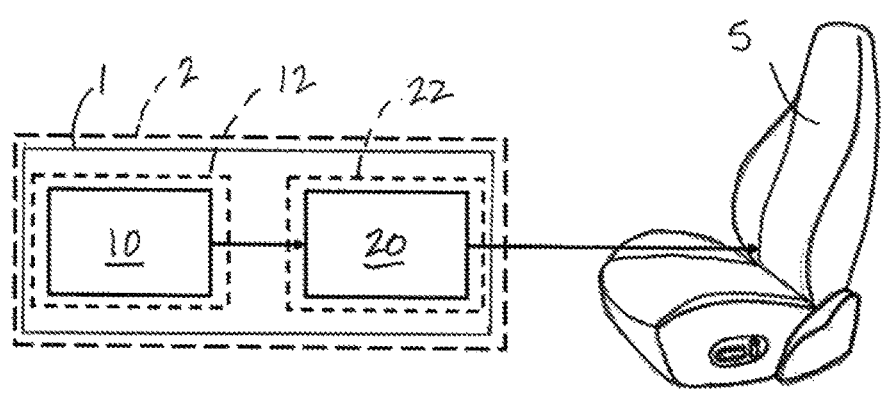
FIG. 2 is a schematic illustration of the actuator of FIG. 1 as, configured to actuate a vehicle seat.

Referring to FIGS. 1 and 2, an actuator 1 such as those used to adjust the position of a vehicle seat 5 may include an electric drive motor 10, and a gear set 20 that is disposed between the drive motor 10 and vehicle seat 5. The gear set 20 transmits the output of the drive motor 10 to the vehicle seat 5. The drive motor 10 and the gear set 20 are housed in an actuator housing 2. The actuator housing 2 includes a gear housing 22 that receives the gear set 20 and supports the gear set 20 for rotation. The actuator housing 2 also includes a drive motor housing 12 that is formed separately from the gear housing 22, and is attached thereto during assembly of the actuator 1. The drive motor housing 12 is joined to the gear housing 22 at one end thereof using snap fit mechanical fasteners 30, as discussed in detail below.

Figure 3:
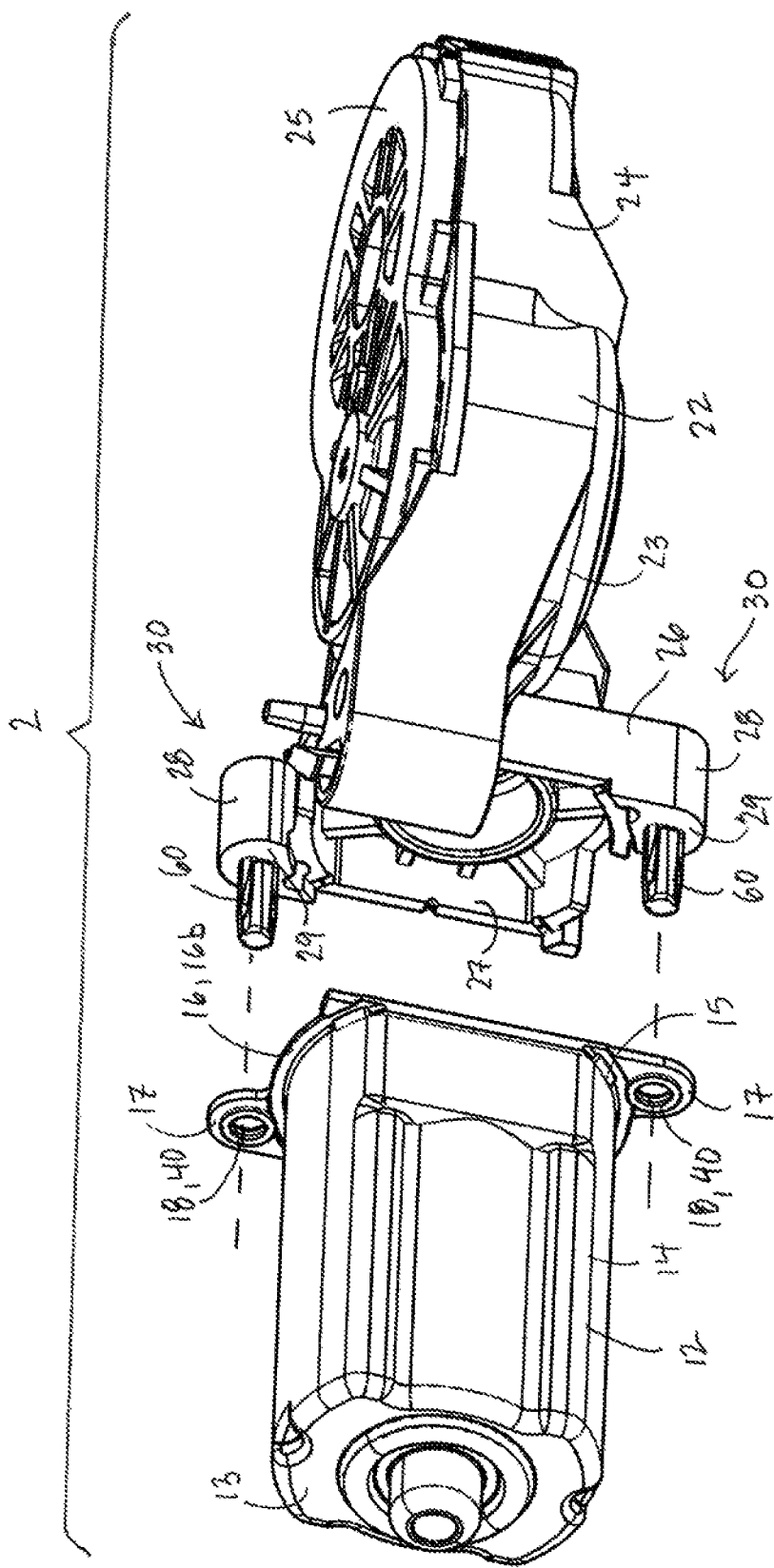
FIG. 3 is an exploded perspective view of the actuator housing of FIG. 1.
Figure 6:
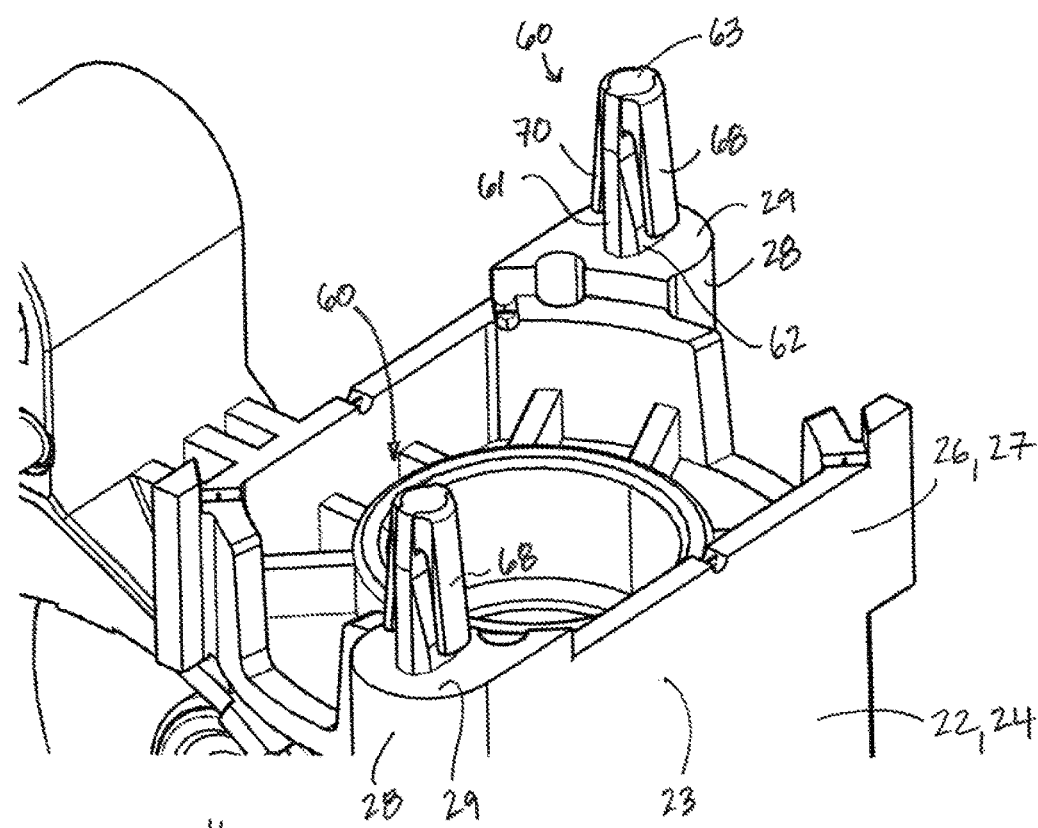
FIG. 6 is a perspective view of a fixture that is provided on an end of the gear housing illustrating retaining portions of the snap-fit fastener.
Figure 7:
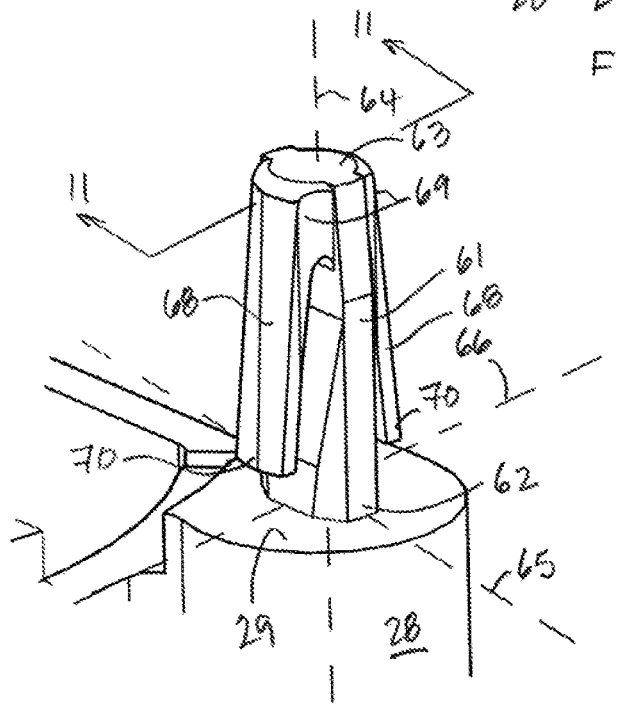
FIG. 7 is a perspective view of a retaining portion of the snap-fit fastener.
Figure 8:
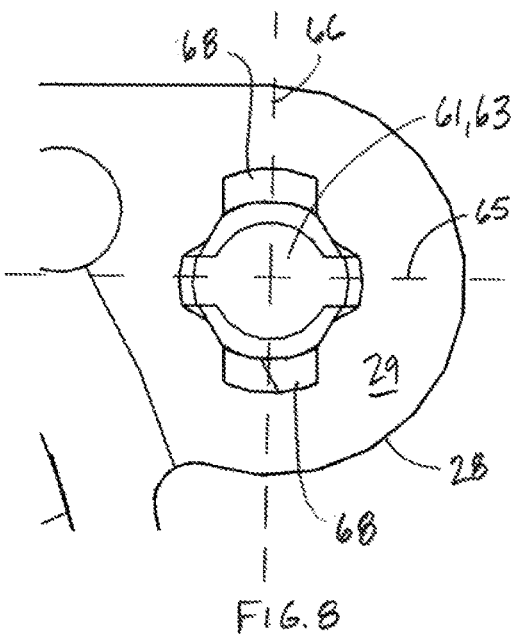
FIG. 8 is an end plan view of a retaining portion of the snap-fit fastener.

Referring to FIG. 3, the drive motor housing 12 is a cup-like enclosure that includes a sidewall 14 having a closed end 13. The open end 15 of the sidewall 14 is opposed to the closed end 13, and is surrounded by a flange 16. The flange 16 protrudes outwardly from an outer surface of the sidewall 14. The flange 16 has a first side 16a that faces the gear housing 22 and a second side 16b that is opposed to the first side 16a. The flange first and second sides 16a, 16b are parallel to the closed end 13. The flange 16 includes a pair of ears 17, which are regions of expanded area that are formed on diametrically opposed sides of the open end 15. Each ear 17 of the flange 16 is provided with a through hole 18 that extends between the flange first side 16a and the flange second side 16b. The through holes 18 form one part (e.g. a receiving portion 40) of the fastener 30, as discussed further below.

The gear housing 22 includes a container 24 that receives the gear set 20, and a cover 25 that closes an open end of the container 24. The gear housing 22 also includes a fixture 26 that is provided at one end of the container 24 and that is configured to enable the gear housing 22 to form a secure and stable connection with the drive motor housing 12. The fixture 26 defines a wall portion 27 that protrudes outward from an outer surface 23 of the container 24 and has a profile or shape that is similar to that of the drive motor housing sidewall 14. The fixture wall portion 27 include a pair of bosses 28 that are formed on diametrically opposed sides of the fixture wall portion 27. The bosses 28 are positioned to be aligned with, and abut, the ears 17 of the drive motor housing flange 16 upon assembly of the drive motor housing 12 with the gear housing 22. In addition, the bosses 28 support another part (e.g., a retaining portion 60) of the fastener 30, as discussed further below.

Referring to FIGS. 4-11, the actuator housing 2 includes two snap fit mechanical fasteners 30. Each fastener 30 includes the receiving portion 40, and the retaining portion 60 that forms a snap-fit engagement with the receiving portion 40. In the illustrated embodiment, the receiving portion 40 is provided on the drive motor housing 12, and the retaining portion 60 is provided on the gear housing 22, but the fastener 30 is not limited to this configuration. For example, in other embodiments, the receiving portion 40 is provided on the gear housing 22, and the retaining portion 60 is provided on the drive motor housing 12.

The receiving portion 40 is an opening in the sidewall of the drive motor housing 12. In particular, the receiving portion 40 is a flange through hole 18.

The retaining portion 60 protrudes from an outer surface of the gear housing 22. In particular, the retaining portion 60 protrudes from a boss 28 of the fixture wall portion 27. The retaining portion 60 protrudes toward the drive motor housing 12, and includes an elongated post 61 and a pair of beams 68 that are cantilevered from the post 61. The post 61 includes a post first end 62 that is fixed to or formed integrally with the end face 29 of the boss 28, and a rounded post second end 63 that is opposed to the post first end 62 and spaced apart from the boss 28. In addition, the post 61 includes a longitudinal axis 64 that extends through both the post first end 62 and the post second end 63 and is perpendicular to the boss end face 29.

The post first end 62 has a generally oval shape when viewed in cross section (FIG. 5), and thus has a first dimension d1 along a first transverse axis 65, and a second dimension d2 along a second transverse axis 66, where the first transverse axis 65 is perpendicular to the longitudinal axis 64 and the second transverse axis 66 is perpendicular to both the longitudinal axis 64 and the first transverse axis 65. The first dimension d1 of the post first end 62 is set to correspond to be the same as, or slightly smaller than, a corresponding dimension dh of the through hole 18. By fitting the first dimension d1 to the dimension dh of the through hole 18 along the first transverse axis 65, movement of the post 61 relative to the through hole 16 is minimized and thus the fastener 30 is made stable. The second dimension d2 is less than the first dimension d1. The space between the post 61 and the through hole 18 along the second transverse axis 66 provides room for the beams 68 to deflect toward the post 61 during insertion of the post 61 into the through hole 18, as discussed further below.

2a. In addition, the post first end 62 has a third dimension d3 along a second transverse axis 66 that is perpendicular to the longitudinal axis 64 and to the first transverse axis 65, and the third dimension d3 is less than the first dimension d1.

In order to provide a robust structure that resists damage, due, for example, to an impact load, which can occur during handling and assembly, the post 61 is tapered along the longitudinal axis 64 so as to be widest at the post first end 62. When seen in side view as viewed in the direction of the second transverse axis 66 (FIG. 9), the post 61 is tapered adjacent the post second end 63, has a maximum dimension d1 at the post first end 62 and has a minimum dimension d3 at the post second end 63. When seen in side view as viewed in the direction of the first transverse axis 65 (FIG. 10), the post 61 is tapered adjacent the post first end 62, and has a minimum dimension d4 at a mid-portion of the post 61.

The retaining portion 60 includes two beams 68. The beams 68 are elastic, elongated, flat plates, and have a generally rectangular shape when viewed in the direction of the second transverse axis 66 (FIG. 9). The beams 68 are arranged so that a beam 68 is provided on each of opposed sides of the post 61. In the illustrated embodiment, the beams 68 reside in a plane defined by the second transverse axis 66 and the longitudinal axis 64. Each beam 68 includes a beam fixed end 69 that extends from the post second end 63, and a beam free end 70 that is spaced apart from the beam fixed end 69. The beams have uniform dimensions d5, d6 from the beam fixed end 69 to the beam free end 70. In addition, the beam free end 70 is spaced apart from, and parallel to, the boss end face 29. The spacing between the beam free end 70 and the boss end face 29 corresponds to a thickness of the flange 16.

Each beam 68 is cantilevered from the post second end 63 so as to overlie the post 61. More specifically, each beam 68 extends at an acute angle θ relative to the longitudinal axis 64 (FIG. 10), whereby the beam free end 70 is spaced apart from the longitudinal axis 64 a distance that is greater than half the dimension dh of the through hole 18 (e.g., greater than the through hole radius). That is, a dimension d7 between the beam free ends 70 is greater than the dimension dh of the through hole 18, and is greater than the first and second dimensions d1, d2 of the post first end 62. In addition, a portion 67 of the surface of the post 61 that faces the beam 68 is angled relative to the longitudinal axis 64 such that the portion 67 of the surface of the post 61 is parallel to a surface 71 of the beam 68 that faces the post 61.

During assembly of the gear housing 22 with the drive motor housing 12, the post 61 is inserted into the receiving portion 40, e.g., into the through hole 18. Since the beam free end 70 is spaced apart from the longitudinal axis 64 a distance that is greater than a radius r of the through hole 18, as the post 61 advances through the through hole 18, the edges of the flange 16 defined by through hole 18 urge the beams 68 to deflect radially inward toward the longitudinal axis 64, whereby the retaining portion 60 radially contracts.

When the gear housing 22 is fully assembled with the drive motor housing 12, the post 61 extends through the through hole 18. In this position, the outer surface of the gear housing (e.g., the boss end face 29) abuts the flange first side 16a. In addition, the post 61 protrudes outward relative to the flange second side 16b, whereby the post second end 63 is spaced apart from the flange 16. Further, the beams 68, which have passed through the through holes 18, elastically return to an expanded configuration whereby the beam free end 70 is spaced apart from the longitudinal axis 64 and faces the flange second side 16b. The retaining portion 60 is retained in connection with the receiving portion 40 via engagement of the beam free ends 70 with the flange second side 16b, which prevents withdrawal of the post 61 from the through hole 18.

In the illustrated embodiment, the actuator housing 2 includes two snap-fit fasteners 30. It is understood, however, that a greater or fewer number of fasteners 30 can be used to join housing components together, and the number of snap-fit fasteners 30 used is determined by t requirements of the specific application.

Selective illustrative embodiments of the housing and fasteners are described above in some detail. It should be understood that only structures considered necessary for clarifying the housing and fasteners have been described herein. Other conventional structures, and those of ancillary and auxiliary components of the housing and fasteners, are assumed to be known and understood by those skilled in the art. Moreover, while a working example of the housing and fasteners have been described above, the housing and fasteners are not limited to the working examples described above, but various design alterations may be carried out without departing from the housing and fasteners as set forth in the claims.

We claim:

1. A fastener configured to join a first housing portion to a second housing portion,
the first housing portion including:
a sidewall; and
a flange that protrudes from the sidewall in a direction that is perpendicular to the sidewall, the flange including a through hole that extends between a flange first side and a flange second side,
wherein
the fastener comprises:
a receiving portion that includes the through hole; and
a retaining portion that protrudes from an outer surface of the second housing portion and forms a snap-fit engagement with the receiving portion, the retaining portion comprising a post and a beam, and
wherein
the post includes a post first end that is fixed to the outer surface of the second housing portion and a post second end that is opposed to the post first end in which a longitudinal axis of the post extends through the post first end and the post second end,
the beam includes:

a beam fixed end that extends from the post second end; and a beam free end that is spaced apart from the beam fixed end, the beam is cantilevered from the post second end so as to overlie the post and extend at an acute angle relative to the longitudinal axis, the beam free end is spaced apart from the longitudinal axis a distance that is greater than a radius of the through hole, wherein a portion of a surface of the post that faces the beam is angled relative to the longitudinal axis such that the portion of the surface of the post is parallel to a surface of the beam that faces the post, the post is configured to extend through the through hole such that the outer surface of the second housing portion abuts the flange first side, the post protrudes outward relative to the flange second side, and the beam free end faces the flange second side.

2. The fastener of claim 1, wherein the first end of the post has a first dimension along a first transverse axis that is perpendicular to the longitudinal axis, and the second end of the post has a second dimension along the first transverse axis, and the second dimension is less than the first dimension.

3. The fastener of claim 2, wherein the first end of the post has a third dimension along a second transverse axis that is perpendicular to the longitudinal axis and to the first transverse axis, and the third dimension is less than the first dimension.

4. The fastener of claim 2, wherein the post has a minimum dimension along the second transverse axis at a location that is spaced apart from the first end of the post.

5. The fastener of claim 2, wherein the post has a minimum dimension along the first transverse axis at the post second end.

6. The fastener of claim 2, wherein the first dimension corresponds to a diameter of the through hole.

7. The fastener of claim 1, wherein the first end of the post has a first dimension along a first transverse axis that is transverse to the longitudinal axis, and a second dimension along a second transverse axis that is transverse to the longitudinal axis and the first transverse axis, where the second dimension is less than the first dimension.

8. The fastener of claim 1, wherein a spacing between the beam free end and the outer surface of the second housing portion corresponds to a thickness of the flange.

9. The fastener of claim 1, wherein the beam is a first beam, and the fastener comprises a second beam disposed on a side of the post that is opposed to the first beam.

10. The fastener of claim 9, wherein the first beam and the second beam reside in a plane that includes the second transverse axis and the longitudinal axis.

11. The fastener of claim 1, wherein the beam free end is parallel to the second side of the flange.

12. An actuator housing comprising a gear housing and a drive motor housing that is secured to the gear housing via a fastener, wherein one of the drive motor housing and the gear housing includes:

a sidewall; and a flange that protrudes from the sidewall in a direction that is perpendicular to the sidewall, the flange including a through hole that extends between a flange first side and a flange second side, and wherein the fastener comprises:

a receiving portion that includes the through hole; and a retaining portion that protrudes from an outer surface of the other of the drive motor housing and the gear housing, and forms a snap-fit engagement with the receiving portion, the retaining portion comprising a post and a beam, and wherein the post includes a post first end that is fixed to the outer surface, and a post second end that is opposed to the post first end in which a longitudinal axis of the post extends through the post first end and the post second end, the beam includes:

a beam fixed end that extends from the post second end; and a beam free end that is spaced apart from the beam fixed end, the beam is cantilevered from the post second end so as to overlie the post and extend at an acute angle relative to the longitudinal axis, the beam free end is spaced apart from the longitudinal axis by a distance that is greater than a radius of the through hole, wherein a portion of a surface of the post that faces the beam is angled relative to the longitudinal axis such that the portion of the surface of the post is parallel to a surface of the beam that faces the post, the post is configured to extend through the through hole such that the outer surface of the gear housing abuts the flange first side, the post protrudes outward relative to the flange second side, and the beam free end faces the flange second side.

13. The actuator housing of claim 12, wherein a spacing between the beam free end and the outer surface of the second housing portion corresponds to a thickness of the flange.

* * * * *

UNITED STATES PATENT AND TRADEMARK OFFICE
CERTIFICATE OF CORRECTION

PATENT NO. : 10,688,884 B2
APPLICATION NO. : 16/103223
DATED : June 23, 2020
INVENTOR(S) : Ortiz et al.

Page 1 of 1

It is certified that error appears in the above-identified patent and that said Letters Patent is hereby corrected as shown below:

On the Title Page

In item (54), in the first line of the title: "SNAG-FIT" should read --SNAP-FIT--.

Signed and Sealed this
Twenty-ninth Day of September, 2020

Andrei Iancu
*Director of the United States Patent and Trademark Office*